US011632516B2

(12) United States Patent
Boyadzhiev et al.

(10) Patent No.: US 11,632,516 B2
(45) Date of Patent: *Apr. 18, 2023

(54) CAPTURE, ANALYSIS AND USE OF BUILDING DATA FROM MOBILE DEVICES

(71) Applicant: MFTB Holdco, Inc., Seattle, WA (US)

(72) Inventors: Ivaylo Boyadzhiev, Seattle, WA (US); Alex Colburn, Seattle, WA (US); Li Guan, Bellevue, WA (US); Qi Shan, Mercer Island, WA (US)

(73) Assignee: MFIB Holdco, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,425

(22) Filed: Jul. 5, 2021

(65) Prior Publication Data
US 2021/0377442 A1    Dec. 2, 2021

Related U.S. Application Data

(63) Continuation of application No. 16/443,881, filed on Jun. 18, 2019, now Pat. No. 11,057,561, which is a
(Continued)

(51) Int. Cl.
*H04N 5/77* (2006.01)
*G01P 1/12* (2006.01)
(Continued)

(52) U.S. Cl.
CPC .............. *H04N 5/77* (2013.01); *G01P 1/127* (2013.01); *G06V 10/17* (2022.01); *G06V 10/457* (2022.01);
(Continued)

(58) Field of Classification Search
CPC ........... H04N 5/23238; H04N 5/23293; H04N 5/23222; H04N 5/77; H04N 7/185; G06K 9/4638; G06K 9/00671; G06K 9/00711
See application file for complete search history.

(56) References Cited

U.S. PATENT DOCUMENTS 5,140,352 A    8/1992    Moore et al.
6,031,540 A    2/2000    Golin et al.
(Continued)

FOREIGN PATENT DOCUMENTS

EP    2413097 A2    2/2012
EP    2505961 A2    10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Jefferey F Harold
*Assistant Examiner* — Timothy R Newlin
(74) *Attorney, Agent, or Firm* — VLP Law Group LLP; James A. D. White

(57) ABSTRACT

Techniques are described for automated operations involving capturing and analyzing information from an interior of a house, building or other structure, for use in generating and providing a representation of that interior. Such techniques may include using a user's mobile device to capture visual data from multiple viewing locations (e.g., video captured while the mobile device is rotated for some or all of a full 360 degree rotation at each viewing location) within multiple rooms, capturing data linking the multiple viewing locations, analyzing each viewing location's visual data to create a panorama image from that viewing location, analyzing the linking data to determine relative positions/directions between at least some viewing locations, creating inter-panorama links in the panoramas to each of one or more other panoramas based on such determined positions/directions, and providing information to display multiple linked panorama images to represent the interior.

29 Claims, 6 Drawing Sheets

Related U.S. Application Data continuation of application No. 15/649,427, filed on Jul. 13, 2017, now Pat. No. 10,375,306.

(51) Int. Cl.
| | | |
|---|---|---|
| *H04N 7/18* | (2006.01) | |
| *G06V 10/10* | (2022.01) | |
| *G06V 10/44* | (2022.01) | |
| *G06V 20/20* | (2022.01) | |
| *G06V 20/40* | (2022.01) | |
| *H04N 23/698* | (2023.01) | |
| *H04N 23/63* | (2023.01) | |
| *H04N 23/60* | (2023.01) | |

(52) U.S. Cl.
CPC ............. *G06V 20/20* (2022.01); *G06V 20/40* (2022.01); *H04N 7/185* (2013.01); *H04N 23/63* (2023.01); *H04N 23/64* (2023.01); *H04N 23/698* (2023.01)

(56) References Cited

U.S. PATENT DOCUMENTS

| | | | |
|---|---|---|---|
| 6,141,034 | A | 10/2000 | McCutchen |
| 6,317,166 | B1 | 11/2001 | McCutchen |
| 6,320,584 | B1 | 11/2001 | Golin et al. |
| 6,323,858 | B1 | 11/2001 | Gilbert et al. |
| 6,337,683 | B1 | 1/2002 | Gilbert et al. |
| 6,654,019 | B2 | 11/2003 | Gilbert et al. |
| 6,683,608 | B2 | 1/2004 | Golin et al. |
| 6,690,374 | B2 | 2/2004 | Park et al. |
| 6,731,305 | B1 | 5/2004 | Park et al. |
| 6,738,073 | B2 | 5/2004 | Park et al. |
| 7,050,085 | B1 | 5/2006 | Park et al. |
| 7,129,971 | B2 | 10/2006 | McCutchen |
| 7,196,722 | B2 | 3/2007 | White et al. |
| 7,525,567 | B2 | 4/2009 | McCutchen |
| 7,620,909 | B2 | 11/2009 | Park et al. |
| 7,627,235 | B2 | 12/2009 | McCutchen et al. |
| 7,782,319 | B2 | 8/2010 | Ghosh et al. |
| 7,791,638 | B2 | 9/2010 | McCutchen |
| 7,909,241 | B2 | 3/2011 | Stone et al. |
| 7,973,838 | B2 | 7/2011 | McCutchen |
| 8,072,455 | B2 | 12/2011 | Temesvari et al. |
| 8,094,182 | B2 | 1/2012 | Park et al. |
| RE43,786 | E | 11/2012 | Cooper |
| 8,463,020 | B1 | 6/2013 | Schuckmann et al. |
| 8,517,256 | B2 | 8/2013 | Stone et al. |
| 8,520,060 | B2 | 8/2013 | Zomet et al. |
| 8,523,066 | B2 | 9/2013 | Stone et al. |
| 8,523,067 | B2 | 9/2013 | Stone et al. |
| 8,528,816 | B2 | 9/2013 | Stone et al. |
| 8,540,153 | B2 | 9/2013 | Stone et al. |
| 8,594,428 | B2 | 11/2013 | Aharoni et al. |
| 8,654,180 | B2 | 2/2014 | Zomet et al. |
| 8,666,815 | B1 | 3/2014 | Chau |
| 8,699,005 | B2 | 4/2014 | Likholyot |
| 8,705,892 | B2 | 4/2014 | Aguilera et al. |
| RE44,924 | E | 6/2014 | Cooper et al. |
| 8,854,684 | B2 | 10/2014 | Zomet |
| 8,861,840 | B2 | 10/2014 | Bell et al. |
| 8,861,841 | B2 | 10/2014 | Bell et al. |
| 8,879,828 | B2 | 11/2014 | Bell et al. |
| 8,953,871 | B2 | 2/2015 | Zomet |
| 8,989,440 | B2 | 3/2015 | Klusza et al. |
| 8,996,336 | B2 | 3/2015 | Malka et al. |
| 9,021,947 | B2 | 5/2015 | Landa |
| 9,026,947 | B2 | 5/2015 | Lee et al. |
| 9,035,968 | B2 | 5/2015 | Zomet |
| 9,041,796 | B2 | 5/2015 | Malka et al. |
| 9,071,714 | B2 | 6/2015 | Zomet |
| 9,129,438 | B2 | 9/2015 | Aarts et al. |
| 9,151,608 | B2 | 10/2015 | Malka et al. |
| 9,165,410 | B1 | 10/2015 | Bell et al. |
| 9,171,405 | B1 | 10/2015 | Bell et al. |
| 9,324,190 | B2 | 4/2016 | Bell et al. |
| 9,361,717 | B2 | 6/2016 | Zomet |
| 9,396,586 | B2 | 7/2016 | Bell et al. |
| 9,438,759 | B2 | 9/2016 | Zomet |
| 9,438,775 | B2 | 9/2016 | Powers et al. |
| 9,489,775 | B1 | 11/2016 | Bell et al. |
| 9,495,783 | B1 | 11/2016 | Samarasekera et al. |
| 9,576,401 | B2 | 2/2017 | Zomet |
| 9,619,933 | B2 | 4/2017 | Spinella-Marno et al. |
| 9,635,252 | B2 | 4/2017 | Accardo et al. |
| 9,641,702 | B2 | 5/2017 | Bin-Nun et al. |
| 9,686,466 | B1* | 6/2017 | Billinghurst ......... H04N 23/635 |
| 9,760,994 | B1 | 9/2017 | Bell et al. |
| 9,786,097 | B2 | 10/2017 | Bell et al. |
| 9,787,904 | B2 | 10/2017 | Bidder et al. |
| 9,836,885 | B1 | 12/2017 | Eraker et al. |
| 9,852,351 | B2 | 12/2017 | Aguilera Perez et al. |
| 9,953,111 | B2 | 4/2018 | Bell et al. |
| 9,953,430 | B1 | 4/2018 | Zakhor |
| 9,990,760 | B2 | 6/2018 | Aguilera Perez et al. |
| 9,990,767 | B1 | 6/2018 | Sheffield et al. |
| 10,026,224 | B2 | 7/2018 | Bell et al. |
| 10,030,979 | B2 | 7/2018 | Bjorke et al. |
| 10,055,876 | B2 | 8/2018 | Ford et al. |
| 10,068,344 | B2 | 9/2018 | Jovanovic et al. |
| 10,083,522 | B2 | 9/2018 | Jovanovic et al. |
| 10,102,639 | B2 | 10/2018 | Bell et al. |
| 10,102,673 | B2 | 10/2018 | Eraker et al. |
| 10,120,397 | B1 | 11/2018 | Zakhor et al. |
| 10,122,997 | B1 | 11/2018 | Sheffield et al. |
| 10,127,718 | B2 | 11/2018 | Zakhor et al. |
| 10,127,722 | B2 | 11/2018 | Shakib et al. |
| 10,139,985 | B2 | 11/2018 | Mildrew et al. |
| 10,163,261 | B2 | 12/2018 | Bell et al. |
| 10,163,271 | B1 | 12/2018 | Powers et al. |
| 10,181,215 | B2 | 1/2019 | Sedeffow |
| 10,192,115 | B1 | 1/2019 | Sheffield et al. |
| 10,204,185 | B2 | 2/2019 | Mrowca et al. |
| 10,210,285 | B2 | 2/2019 | Wong et al. |
| 10,235,797 | B1 | 3/2019 | Sheffield et al. |
| 10,242,400 | B1 | 3/2019 | Eraker et al. |
| 10,339,716 | B1 | 7/2019 | Powers et al. |
| 10,366,531 | B2 | 7/2019 | Sheffield |
| 10,395,435 | B2 | 8/2019 | Powers et al. |
| 2005/0185070 | A1* | 8/2005 | Cheatle ................. H04N 23/635 |
| | | | 348/E5.047 |
| 2006/0256109 | A1 | 11/2006 | Acker et al. |
| 2009/0024628 | A1* | 1/2009 | Angel .................... G06Q 20/40 |
| | | | 707/999.009 |
| 2010/0232709 | A1 | 9/2010 | Zhang et al. |
| 2012/0075414 | A1 | 3/2012 | Park et al. |
| 2012/0293613 | A1 | 11/2012 | Powers et al. |
| 2013/0050407 | A1 | 2/2013 | Brinda et al. |
| 2013/0342533 | A1 | 12/2013 | Bell et al. |
| 2014/0043436 | A1 | 2/2014 | Bell et al. |
| 2014/0044343 | A1 | 2/2014 | Bell et al. |
| 2014/0044344 | A1 | 2/2014 | Bell et al. |
| 2014/0125658 | A1 | 5/2014 | Bell et al. |
| 2014/0125767 | A1 | 5/2014 | Bell et al. |
| 2014/0125768 | A1 | 5/2014 | Bell et al. |
| 2014/0125769 | A1 | 5/2014 | Bell et al. |
| 2014/0125770 | A1 | 5/2014 | Bell et al. |
| 2014/0236482 | A1 | 8/2014 | Dorum et al. |
| 2014/0267631 | A1 | 9/2014 | Powers et al. |
| 2014/0307100 | A1 | 10/2014 | Myllykoski et al. |
| 2014/0320674 | A1 | 10/2014 | Kuang |
| 2015/0116691 | A1 | 4/2015 | Likholyot |
| 2015/0189165 | A1* | 7/2015 | Milosevski ......... H04N 5/23222 |
| | | | 386/230 |
| 2015/0262421 | A1 | 9/2015 | Bell et al. |
| 2015/0269785 | A1 | 9/2015 | Bell et al. |
| 2015/0271400 | A1* | 9/2015 | Chen ................... H04N 23/698 |
| | | | 348/36 |
| 2015/0302636 | A1 | 10/2015 | Arnoldus et al. |
| 2015/0310596 | A1 | 10/2015 | Sheridan et al. |
| 2015/0332464 | A1 | 11/2015 | O'Keefe et al. |
| 2016/0055268 | A1 | 2/2016 | Bell et al. |
| 2016/0134860 | A1 | 5/2016 | Jovanovic et al. |

(56) References Cited

U.S. PATENT DOCUMENTS

| | | | |
|---|---|---|---|
| 2016/0140676 | A1 | 5/2016 | Fritze et al. |
| 2016/0217225 | A1 | 7/2016 | Bell et al. |
| 2016/0260250 | A1 | 9/2016 | Jovanovic et al. |
| 2016/0286119 | A1 | 9/2016 | Rondinelli |
| 2016/0300385 | A1 | 10/2016 | Bell et al. |
| 2017/0034430 | A1 | 2/2017 | Fu et al. |
| 2017/0067739 | A1 | 3/2017 | Siercks et al. |
| 2017/0194768 | A1 | 7/2017 | Powers et al. |
| 2017/0195654 | A1 | 7/2017 | Powers et al. |
| 2017/0263050 | A1 | 9/2017 | Ha et al. |
| 2017/0324941 | A1 | 11/2017 | Birkler |
| 2017/0330273 | A1 | 11/2017 | Holt et al. |
| 2017/0337737 | A1 | 11/2017 | Edwards et al. |
| 2018/0007340 | A1 | 1/2018 | Stachowski |
| 2018/0025536 | A1 | 1/2018 | Bell et al. |
| 2018/0075168 | A1 | 3/2018 | Tiwari et al. |
| 2018/0139431 | A1 | 5/2018 | Simek et al. |
| 2018/0143023 | A1 | 5/2018 | Bjorke et al. |
| 2018/0143756 | A1 | 5/2018 | Mildrew et al. |
| 2018/0144487 | A1 | 5/2018 | Bell et al. |
| 2018/0144535 | A1 | 5/2018 | Ford et al. |
| 2018/0144547 | A1 | 5/2018 | Shakib et al. |
| 2018/0144555 | A1 | 5/2018 | Ford et al. |
| 2018/0146121 | A1 | 5/2018 | Hensler et al. |
| 2018/0146193 | A1 | 5/2018 | Safreed et al. |
| 2018/0146212 | A1 | 5/2018 | Hensler et al. |
| 2018/0165871 | A1 | 6/2018 | Mrowca |
| 2018/0203955 | A1 | 7/2018 | Bell et al. |
| 2018/0241985 | A1 | 8/2018 | O'Keefe et al. |
| 2018/0293793 | A1 | 10/2018 | Bell et al. |
| 2018/0300936 | A1 | 10/2018 | Ford et al. |
| 2018/0306588 | A1 | 10/2018 | Bjorke et al. |
| 2018/0348854 | A1 | 12/2018 | Powers et al. |
| 2018/0365496 | A1 | 12/2018 | Hovden et al. |
| 2019/0012833 | A1 | 1/2019 | Eraker et al. |
| 2019/0026956 | A1 | 1/2019 | Gausebeck et al. |
| 2019/0026957 | A1 | 1/2019 | Gausebeck |
| 2019/0026958 | A1 | 1/2019 | Gausebeck et al. |
| 2019/0035165 | A1 | 1/2019 | Gausebeck |
| 2019/0041972 | A1 | 2/2019 | Bae |
| 2019/0050137 | A1 | 2/2019 | Mildrew et al. |
| 2019/0051050 | A1 | 2/2019 | Bell et al. |
| 2019/0051054 | A1 | 2/2019 | Jovanovic et al. |
| 2019/0087067 | A1 | 3/2019 | Hovden et al. |
| 2019/0122422 | A1 | 4/2019 | Sheffield et al. |
| 2019/0164335 | A1 | 5/2019 | Sheffield et al. |
| 2019/0180104 | A1 | 6/2019 | Sheffield et al. |
| 2019/0251645 | A1 | 8/2019 | Winans |
| 2019/0287164 | A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

Immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

Insidemaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

* cited by examiner

CAPTURE, ANALYSIS AND USE OF BUILDING DATA FROM MOBILE DEVICES

CROSS-REFERENCE TO RELATED APPLICATIONS

This application is a continuation of co-pending U.S. patent application Ser. No. 16/443,881, filed Jun. 18, 2019 and entitled "Capture, Analysis And Use Of Building Data From Mobile Devices;" which is a continuation of U.S. patent application Ser. No. 15/649,427, filed Jul. 13, 2017 and entitled "Capture And Use Of Building Interior Data From Mobile Devices", now U.S. Pat. No. 10,375,306; each of which is hereby incorporated by reference in its entirety.

TECHNICAL FIELD

The following disclosure relates generally to techniques for the acquisition and analysis of information from an interior of a building in order to generate and provide a representation of that interior, such as to capture video data from a mobile device that represents a house's interior at multiple viewing locations for use along with other data from the mobile device in generating and presenting linked panorama images of various locations within the house.

BACKGROUND

In various fields and circumstances, such as real estate acquisition and development, property inspection, architectural analysis, general contracting, improvement cost estimation and other circumstances, it may be desirable to view the interior of a house, office, or other building without having to physically travel to and enter the building. While traditional still photographs of a building's interior may provide some understanding of that interior, it is difficult to fully understand the layout and other details of the interior from such photographs. However, it can be difficult or impossible to accurately and efficiently capture more immersive types of visual information for building interiors, without spending significant time and using specialized equipment.

DETAILED DESCRIPTION

Figure 1:
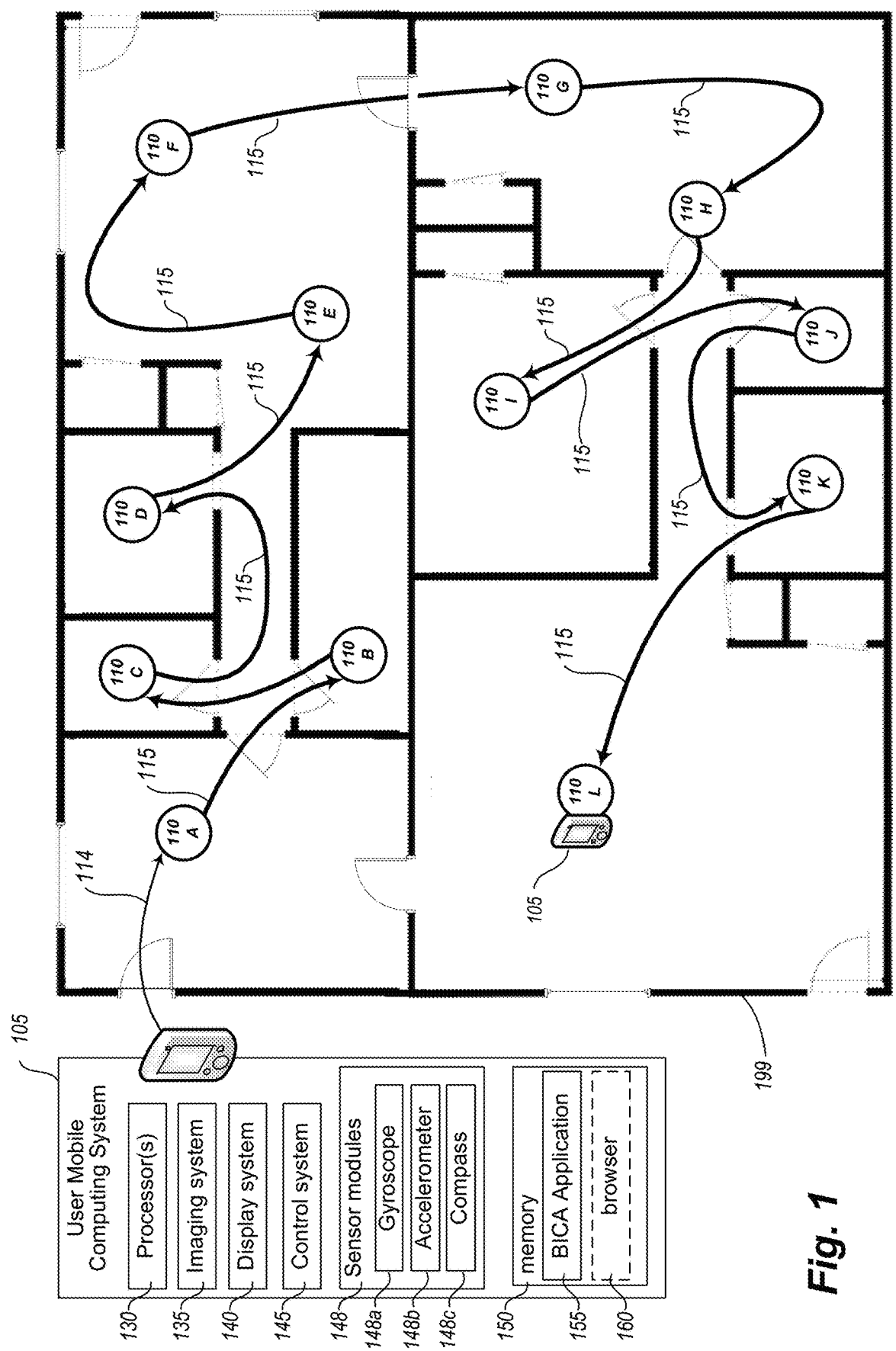
FIG. 1 is a schematic diagram depicting an exemplary building interior environment and mobile computing system in accordance with an embodiment of the present disclosure.

The present disclosure relates generally to techniques for one or more devices to perform automated operations involved in acquiring and analyzing information from an interior of a house, building or other structure, for use in generating and providing a representation of that interior. For example, in at least some such embodiments, such techniques may include using one or more mobile devices (e.g., a smart phone held by a user, a camera held by or mounted on a user or the user's clothing, etc.) to capture video data from a sequence of multiple viewing locations (e.g., a video captured at each viewing location while a mobile device is rotated for some or all of a full 360 degree rotation at that viewing location) within multiple rooms of a house (or other building), and to further capture data linking the multiple viewing locations. The capturing of the data linking two successive viewing locations in the sequence may include, for example, capturing movement data (e.g., acceleration and other data from an IMU, or inertial measurement unit, of a mobile device) as a user with the mobile device walks or otherwise moves between the two viewing locations, as well as optionally recording video or other visual data for at least some of the user movement. After the viewing location videos and linking data are captured, the techniques may include analyzing video captured at each viewing location to create a panorama image from that viewing location that has visual data in multiple directions (e.g., a 360 degree panorama image around a vertical axis), analyzing the linking data to determine relative positions/directions between each of two or more viewing locations, creating inter-panorama positional/directional links in the panoramas to each of one or more other panoramas based on such determined positions/directions, and then providing information to display or otherwise present multiple linked panorama images for the various viewing locations within the house. Some or all of the techniques described herein may be performed via automated operations of an embodiment of a Building Interior Capture and Analysis ("BICA") system, as discussed in greater detail below.

Thus, in at least some embodiments, one or more processor-based computing systems are used to capture and generate information regarding a building interior based on recorded visual information (e.g., video, photographic images, etc.) and/or sensor data captured by a mobile device at each of multiple viewing locations within the building interior, as well as based on sensor data (and possibly additional recorded visual information) captured during movement of the mobile device between such arbitrary viewing locations. As used herein, a generated "panorama image" refers to any visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. As used herein, the term "building" refers to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls and department stores), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. The term "sequence" of viewing locations, as used herein, refers generally to two or more viewing locations that are each visited at least once in a corresponding order, whether or not other non-viewing locations are visited between them, and whether or not the visits to the viewing locations occur during a single continuous period of time or at multiple different time periods.

For illustrative purposes, some embodiments are described below in which specific types of information are acquired and used in specific types of ways for specific types of structures and by using specific types of devices. However, it will be understood that such described techniques may be used in other manners in other embodiments, and that the invention is thus not limited to the exemplary details provided. As one non-exclusive example, various of the embodiments discussed herein include a mobile device being carried by a user while the mobile device captures various types of data, but in other embodiments one or more such mobile devices may move within some or all of a building interior in other manners, such as if carried by or integrated in an aerial or ground-based drone, robot or other autonomous, semi-autonomous and/or remotely controlled device with motion capabilities. As another non-exclusive example, while some illustrated embodiments include the linked panorama images representing or covering a single house or other structure, in other embodiments the linked panoramas may extend beyond a single such house or other structure, such as to include links to and panorama images of (or other visual representations of) an exterior environment associated with the structure (e.g., yard; pool; separate garages, sheds, barns, pool houses, boat houses, guest quarters or other outbuildings; etc.), of one or more other nearby houses or other structures (e.g., on a same city block), of nearby streets, roads and/or other areas, etc., as well as to include apartment buildings, office buildings, condominiums and other multi-tenant buildings or structures. As yet another non-exclusive example, while some illustrated embodiments include linking and presenting multiple panorama images, other embodiments may include linking and/or presenting other types of information (whether in addition to or instead of such panorama images), such as videos or other visual information from each of multiple viewing locations that are in forms other than panorama images, information based on infrared and/or ultraviolet and/or other non-visible light or energy (e.g., radiation levels; electromagnetic field, or EMF, levels; etc.), audio information from the environment surrounding a viewing location and/or from other sources (e.g., a recording user's annotations or other verbal descriptions), etc. As yet another non-exclusive example, while some illustrated embodiments include linked panoramas or other generated representation of a building interior (and/or other captured targets) on a display of client device to an end user, visual and/or audio and/or other information (e.g., haptic information) may be presented or otherwise provided to end users in other manners, such as part of an augmented reality ("AR") system (e.g., via specialized glasses or other head-mounted display) and/or a virtual reality ("VR") system (e.g., via specialized headgear and/or other output devices). In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1 depicts a block diagram of an exemplary building interior environment and mobile computing system in accordance with an embodiment of the present disclosure. In particular, FIG. 1 includes a building 199 with an interior to be captured by a user mobile computing system 105 (also referred to as a "mobile device" for this example) as it is moved through the building interior to a sequence of multiple viewing locations 110 by a user (not shown) via a travel path 115. A Building Interior Capture & Analysis ("BICA") system may automatically perform or assist in the capturing of the data representing the building interior, as well as further analyze the captured data to generate a visual representation of the building interior, as discussed further herein—in this example, the BICA system is executing as a local application 155 on the mobile device 105, although in other embodiments it may execute in part or in whole on one or more other computing systems (not shown) that are remote from the building 199, as discussed in greater detail with respect to FIG. 2.

In the depicted embodiment, the mobile device 105 includes one or more hardware processors 130; one or more imaging systems 135, which include photographic and video recording capabilities (optionally with one or more specialized lenses and/or additional associated equipment, as discussed elsewhere herein); a display system 140, which includes a main display screen having a plurality of graphical display elements, and may further include other components of the mobile device (such as one or more light-emitting elements aside from the main display screen); a control system 145, such as to include an operating system, graphical user interface ("GUI"), etc.; and one or more sensor modules 148, which in the depicted embodiment include a gyroscope module 148a, an accelerometer module 148b, and a compass module 148c (e.g., as part of one or more IMU units of the mobile device). In other embodiments, the sensor modules 148 may include additional sensors, such as an altimeter module, barometric module, light detection module, one or more microphones, etc., and other output modules (e.g., one or more speakers or audio output ports) may be provided. In at least some embodiments, the display system 140 may include a touchscreen component of the control system 145, such that at least some operations of the mobile device may be controlled by physical user interaction with elements of a graphical user interface presented via the display system. The mobile device as depicted further includes a memory 150, which in the illustrated embodiment is executing the BICA application 155, and may optionally also be executing a browser application 160, although in other embodiments the device that captures the video and/or other sensor data for the building interior may transfer the captured data to one or more other devices (not shown) executing a copy of the BICA application for analysis. In one or more embodiments, additional components or applications may also be executing within the memory 150 of the mobile device.

In operation, a user associated with the mobile device 105 enters the building interior 199 via travel path 114, arriving with the mobile device at a first viewing location 110A within a first room of the building interior. In response to one or more interactions of the user with the control system 145 of the mobile device, the BICA application initiates recording a first video of the building interior, capturing a view of the building interior from first viewing location 110A (e.g., some or all of the first room, and optionally small portions of one or more other adjacent or nearby rooms, such as through doors, halls or other connections from the first room) as the mobile device is rotated around a vertical axis at the first viewing location (e.g., with the user turning his or her body in a circle while holding the mobile device stationary relative to the user's body). In addition to recording video, the BICA application may monitor, and/or initiate concurrent recording of, various data provided by the sensor modules 148. For example, the BICA application may monitor a rotational speed of the mobile device via data provided by the gyroscopic module and/or accelerometer module; may associate with the recorded video a heading reported by the compass module at the time the video recording is initiated; etc. In certain embodiments, the BICA application may analyze one or more video frames captured during the recording process to determine and/or automatically correct issues regarding the recorded video, such as to correct or compensate for an undesirable level of exposure, focus, motion blur, noise level, or other issue. Furthermore, in certain scenarios and embodiments, a viewing location may be captured in other manners, including to capture multiple still photographs from different perspectives and angles at the viewing location rather than recording video data at the viewing location.

In certain embodiments, the BICA application may provide real-time feedback to the user of the mobile device via one or more guidance cues during the recording of the first video of the building interior, such as to provide guidance for improving or optimizing movement of the mobile device during the recording process. For example, the BICA application may determine (such as based on sensor data provided by sensor modules 148) that the mobile device is rotating too quickly to record high quality video from the first viewing location, and if so may provide an auditory, visual, or other appropriate notification to indicate that the user should rotate the mobile device more slowly during the recording process. As another example, the BICA application may determine that the mobile device is shaking or otherwise failing to provide high quality video (such as based on sensor data or one or more analyses of particular captured video frames), and if so may provide a notification to advise the user of the problem. As still another example, in certain embodiments the BICA application may provide a notification to the user if it is determined that a particular viewing location is unsuitable for capturing information about the building interior, such as if the BICA application detects that lighting conditions or other environmental factors for the present viewing location are negatively affecting the recording process. In certain scenarios and embodiments, the BICA application may re-initiate the recording process once one or more conditions interfering with high-quality recording have been alleviated.

Furthermore, in certain embodiments the BICA application may prompt a user for information regarding one or more of the viewing locations being captured, such as to provide a textual or auditory identifier to be associated with a viewing location (e.g., "Living Room," "Office," "Bedroom 1" or other identifier), or to otherwise capture descriptive information from the user about the room (e.g., a description of built-in features, a history of remodels, information about particular attributes of the interior space being recorded, etc.). In at least one embodiment, such identifiers and/or other descriptive information may be later incorporated in or otherwise utilized with the captured information for a viewing location, such as to provide a textual or auditory indication of the identifier or other descriptive information during subsequent display or other presentation of the building interior by the BICA application or system (or by another system that receives corresponding information from the BICA application).

In one or more embodiments, the BICA application may further determine to modify one or more parameters of the imaging system 135 as part of improving quality of or otherwise improving some or all video recorded during capture of a building interior. For example, in certain scenarios the BICA application may automatically determine to use one or more of various exposure, aperture, and focus parameters; and may automatically adjust one or more parameters based on a type of lens or lenses used by the imaging system, such as if the imaging system includes multiple lenses of different focal lengths or to compensate for an atypical lens type (e.g., "fisheye," wide-angle, or telephoto lenses). The BICA application may also optionally initiate display of one or more GUI elements to suggest parameters of the imaging system for modification to the user in order to improve video recording quality in a particular embodiment or situation (e.g., if the BICA application is unable to automatically modify such parameters). In addition, in some embodiments, the capture of some or all of the video at one or more viewing locations may use additional equipment to assist in the capture, such as one or more of a tripod, additional lighting, a 3D laser scanner and rangefinder (e.g., using LIDAR) or other depth finder, one or more additional and/or external lenses, an external camera (e.g., a 360° camera), an infrared emitter and/or detector, an ultraviolet emitter and/or detector, one or more external microphones, etc.

In various circumstances and embodiments, the BICA application may determine that multiple rotations of the mobile device at a viewing location are desirable to adequately capture information there. As non-limiting examples, the BICA application may determine to record video having a greater dynamic range, such as by initiating multiple rotations of the mobile device at different exposure values; or to capture a greater vertical arc of the building interior, such as by initiating multiple rotations of the multiple device with distinct z-angles (e.g., one rotation in a lateral direction that is approximately perpendicular to the vertical axis; another rotation in which the vertical angle of the device is raised above that perpendicular direction, such as to include at least some of the ceiling; another rotation in which the vertical angle of the device is lowered below that perpendicular direction, such as to include at least some of the floor; etc.). In such circumstances, the BICA application may provide one or more notifications or instructions to the user of the mobile device in order to indicate the desirability of such multiple rotations.

In at least some embodiments, at a time after initiating the recording of the first video of the building interior in the first room, the BICA application may automatically determine that the first viewing location 110A has been adequately captured, such as by determining that a full rotation of the mobile device has been completed, or that sufficient data is otherwise acquired. For example, the BICA application may determine that the reported heading of the mobile device has returned to or passed a heading associated with the beginning of the video recording, that the mobile device has rotated a full 360° since video recording was initiated, that the user has stopped rotation for a defined period of time (e.g., a small number of seconds, such as after being prompted by the BICA application to stop the rotation for that amount of time when the rotation is complete), etc. In at least some embodiments, the BICA application may provide one or more guidance cues to the user of the mobile device to indicate that a capture of the building interior from the first viewing location 110A is completed and that the user may proceed to additional viewing locations within the building interior. It will be appreciated that in certain scenarios, capture of a particular viewing location may not require a full 360° rotation of the mobile device in order to be adequately completed. For example, viewing locations in close proximity to walls or corners may be adequately represented by only a partial such rotation of the mobile device. Furthermore, in certain scenarios and embodiments, a BICA application or system may create a panorama image for a particular viewing location without the mobile device 105 completing a full rotation while recording video from that viewing location. In such scenarios, the BICA application or system may compensate for the partial rotation in various manners, including but not limited to: limiting a number of component images to include in the panorama image if a disparate quantity of video information is recorded from the viewing location for other portions of the building interior; generating one or more interpolated component images that do not wholly correspond to a single video frame recorded from the viewing location; or other manner, and with the resulting panorama image optionally being less than 360 degrees.

Continuing the example of FIG. 1, once the first viewing location 110A has been captured in the first room, the mobile device 105 moves along travel path 115 as the user carries it to a next viewing location 110B, which in this example is in a different second room through 2 doors and an intervening hallway. As the mobile device is moved between viewing locations, the BICA application captures linking information that includes acceleration data associated with the movement of the mobile device, such as that received from accelerometer module 148b, and in certain embodiments may capture additional information received from other of the sensor modules 148, including to capture video or other visual data along at least some of the travel path in some embodiments and situations. In various embodiments, and depending upon specific configuration parameters of sensor modules 148, disparate quantities of acceleration data may be collected corresponding to movement of the mobile device along travel path 115. For example, in certain scenarios acceleration data and other sensor data may be received from the sensor modules at regular periodic intervals (e.g., 1000 data points a second, 100 data points a second, 10 data points a second, 1 data point a second, etc.), while other scenarios and/or sensor modules may result in such sensor data being received irregularly, or at varying periodic intervals. In this manner, the BICA application may receive greater or lesser quantities of acceleration data during travel of the mobile device between viewing locations depending on the capabilities and configuration of the particular sensor modules 148 included within the particular mobile device 105.

In one or more embodiments, the BICA application may further determine to terminate video recording for a viewing location in various manners (such as based on automatic detection of movement away from the viewing location, on one or more defined user preferences, on an explicit user request, on a full rotation of the mobile device or period of non-movement or other determination that the viewing location is adequately captured, etc. In other scenarios, the BICA application may continue video recording without termination between capturing video of a viewing location and subsequent movement of the mobile device along travel path 115—in such embodiments, the BICA application may associate with the captured video (either at the time of recording or during later analysis of such captured video, described elsewhere herein) one or more indications of demarcation ("markers" or "separation points") corresponding to a detected change between receiving sensor data indicative of rotation around a vertical axis (typically associated with capturing of a viewing location) and receiving sensor data indicative of lateral or vertical movement typically associated with movement between such viewing locations), optionally after a defined period of substantially no movement. The BICA application may further determine to maintain video recording until receiving an indication that all capture of a building interior has been completed (such as completion of video recording for a final viewing location within the building interior). It will be appreciated that during the course of multiple segments of movement through a building interior at and between multiple viewing locations, the BICA application may determine to maintain and utilize continuous video recording during all segments of such movement, one or more individual/contiguous segments of such movement, or no segments of such movement at all. In at least some embodiments, such determination may be based on one or more of defined user preferences, configuration parameters, available resources (such as storage capacity or other resources) of the mobile device 105, a quantity or type(s) of sensor data captured during such movement, or other factors.

In addition, and in a manner similar to the guidance cues and other instructions provided during capture of viewing location 110A, the BICA application may in certain embodiments provide guidance cues and other instructions to a user during movement of the mobile device between viewing locations. For example, in certain embodiments the BICA application may notify the user if such movement has exceeded a defined or suggested distance from the previous viewing location, or if the user is attempting to capture a next viewing location that is determined by the BICA application to be too close to the previous viewing location, or if the user is engaging in too much movement of a particular type (e.g., sideways rather than forward). Furthermore, in an manner analogous to video recording for a viewing location, the BICA application may determine to terminate video recording for a travel path between viewing locations in various manners (such as based on a period of non-movement at the end of the travel path or other determination that the travel path is adequately captured, on an explicit user request, on one or more defined user preferences, etc.).

Continuing the illustrated example of FIG. 1, once the mobile device has arrived at the next viewing location 110B, the BICA application may determine to begin capture of the viewing location. If video is currently being recorded, the BICA application may associate with the captured video (either at the time of recording or during later analysis of such captured video) one or more markers corresponding to recording of a new viewing location (e.g., based on a determined period of non-movement after the movement to the new viewing location is completed; on a detected change in receiving sensor data indicative of lateral or vertical movement between viewing locations and receiving sensor data indicative of rotation around a vertical axis; etc.). If video is not currently being recorded, the BICA application may in certain embodiments automatically initiate such video recording upon detection that the user has begun to rotate the mobile device, in response to a user request to begin capturing the next viewing location (such as via one or more interactions of the user with the BICA application and/or imaging system 135 via the control system 145), or in other manners as previously noted.

In a manner similar to that described with respect to viewing location 110A, the BICA application captures viewing location 110B by recording video during rotation of the mobile device around a vertical axis at viewing location 110B, optionally modifying imaging system parameters and providing guidance cues or other instructions to the user of the mobile device in order to improve the recorded video associated with the viewing location. Upon determination that the viewing location 110B has been adequately captured (either automatically or in response to a user request as described above with respect to the capture of viewing location 110A), in certain embodiments the BICA application may receive a user request to terminate or to continue capture of the building interior, such as via one or more user interactions with a graphical user interface provided by the BICA application or in some other manner (e.g., user interaction with elements of control system 145). For example, in accordance with one or more embodiments and/or defined user preferences, the BICA application may determine to continue capture of the building interior unless a user request indicating otherwise is received; in other embodiments or in accordance with other defined user preferences, the BICA application may automatically terminate capture of the building interior unless and until user interaction is received indicating that one or more additional viewing locations (and linking information during movement to such additional viewing locations) is to be captured.

In the depicted embodiment of FIG. 1, additional viewing locations 110C-110L, as well as linking information gathered during movement between such viewing locations, are captured by the BICA application as the user moves the mobile device 105 through building 199 interior along travel paths 115. Upon conclusion of capturing recorded video corresponding to rotation around a vertical axis located at a last viewing location 110L in the sequence, the BICA application determines to terminate (such as in response to a user request) the capture of the building interior. While the sequence of viewing locations and associated travel path do not include any overlap in this example (e.g., with one portion of the travel path crossing another portion of the travel path; one viewing location being the same as or overlapping with another viewing location, such as to have a loop in which the last viewing location is the same as the first viewing location or other viewing location; etc.), other embodiments and situations may include one or more such overlaps. Similarly, while the sequence of viewing locations are traveled in a continuous manner in this example, other embodiments and situations may include a non-contiguous path—as one non-limiting example, the user in FIG. 1 could stop after travelling from viewing locations 100A-110F, and complete the sequence by resuming at viewing location 110L and returning back to viewing location 110F along the intervening portion of the travel path 115 (resulting in a different order of viewing locations for the sequence than the one shown in FIG. 1), whether substantially immediately or after an intervening period of time has passed.

In at least some embodiments, either immediately upon terminating the capture of building interior or at a later time, a panorama image is generated for each of viewing locations 110A-101L based on one or more analyses of the respective video recording corresponding to each such viewing location. Various operations may be performed on individual frames of such a video recording as part of generating a corresponding panorama image. Non-limiting examples of such operations include sharpening, exposure modification, cropping, integration of multiple exposures (such as if multiple rotations using distinct exposure parameters were used in order to expand a dynamic range of the recorded video), deblurring (such as to compensate for detected motion blur), and selective discarding of particular video frames (such as based on a determination that such frames are out of focus, over- or under-exposed, duplicative of other video frames, or on other criteria). Once the individual frames of the video recording have been selected and modified in accordance with the operations described above, the resulting images are stored by the BICA system as a single panorama image, such as to include multiple navigable component images.

In addition to generating panorama images corresponding to each of the viewing locations within the building interior, analysis of the linking information corresponding to each segment of travel path 115 is performed in order to determine relative positional information between at least successive pairs of viewing locations along that travel path. In particular, acceleration data corresponding to each such segment is analyzed to determine, for example, a relative location of viewing location 110B with respect to previous viewing location 110A (and vice versa), with viewing locations 110A and 110B being a first pair of successive viewing locations; a relative location of viewing location 110C with respect to previous viewing location 110B (and vice versa), with viewing locations 110B and 110C being a second pair of successive viewing locations; and so on. In at least some embodiments, additional sensor data may be considered during such analysis. For example, for building interiors encompassing multiple floors or other elevations, in addition to analyzing vertical acceleration data to determine a relative vertical distance between viewing locations, the BICA system may additionally make such determination based on available altimeter data, barometric data, gyroscopic data, etc. In addition, recorded video captured as part of the linking information or as part of capturing a particular viewing location may be analyzed as part of determining the relative positional information. For example, in certain embodiments individual video frames within separate segments of recorded video, corresponding to video recorded from separate viewing locations, may be analyzed to determine similarities between such video frames—for example, one or more video frames recorded as part of capturing viewing location 110E may be compared with one or more additional video frames recorded as part of capturing viewing location 110F as part of determining relative positional information regarding those viewing locations. It will be appreciated that while analysis of the linking information may only directly result in relative positional information between successive viewing locations along travel path 115 (e.g., between viewing locations 110D and 110E, or viewing locations 110G and 110H), a full analysis of such linking information may in certain embodiments indirectly result in the BICA system determining relative positional information between additional viewing locations as well (e.g., between viewing locations 110I and 110G, or viewing locations 110B and 110L).

In one or more embodiments, generating a panorama image for a viewing location may include determining one or more component images to use as primary component images of the panorama image, such as to initially display when the panorama image is first presented to a user. Various criteria may be utilized by the BICA system when determining primary component images for a generated panorama image, including as non-limiting examples: a component image that includes a view of a quantity of other viewing locations within the building interior; a component image determined to be of higher quality than other component images within the generated panorama image (such as based on a depth of field, exposure, lighting quality, or other attribute); etc.—thus, selection of a primary component image may be unrelated to the sequence of video frames originally recorded from the viewing location corresponding to the generated panorama image. In certain scenarios and embodiments, multiple primary component images may be selected when generating a panorama image, such as to reflect a respective direction from which a viewer might arrive at the corresponding viewing location from other viewing locations within the building interior. With reference to FIG. 1, for example, the BICA system may determine to select a first primary component image of the panorama image for viewing location 110E that corresponds to the perspective of a viewer arriving from viewing locations 110A or 110D (i.e., an image based on video recorded while the mobile device 105 was facing approximately away from viewing location 110D), and may determine to select a second primary component image of the 110E panorama image that corresponds to the perspective of a viewer arriving from viewing location 110F (i.e., an image based on video recorded while the mobile device 105 was facing approximately toward the wall of the room in the direction of viewing location 110I).

In the depicted embodiment of FIG. 1, the generation of the panorama images and determination of relative positional information is performed locally by the one or more processors 130 via BICA application 155 executing in memory 150 of the mobile device 105. In various embodiments, some or all of such processing may be handled by one or more remote server computing systems executing an embodiment of a Building Interior Capture and Analysis system, as discussed in greater detail with respect to FIG. 2 below.

Figure 2:
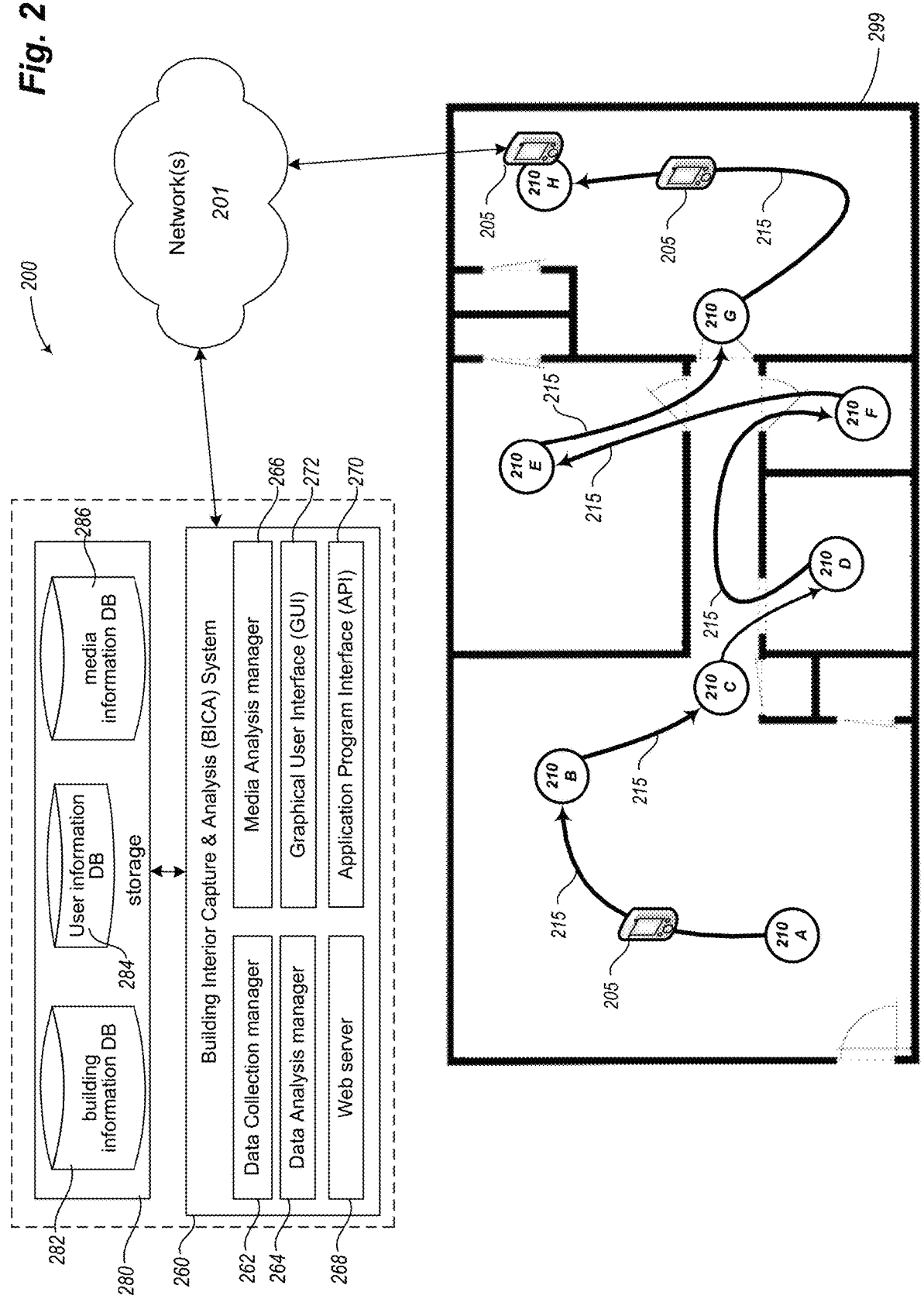
FIG. 2 is a schematic diagram of an additional exemplary building interior environment and computing systems in accordance with an embodiment of the present disclosure.

FIG. 2 is a schematic diagram of an additional exemplary building interior environment being captured via embodiments of a BICA system. In particular, in the depicted embodiment of FIG. 2, a mobile device 205 (optionally executing an embodiment of a BICA client application) is utilized to capture each of multiple viewing locations 210A-210H within the interior of building 299, as well as to capture associated linking information during movement of the mobile device 205 between such viewing locations. In addition, the depicted embodiment of FIG. 2 further includes a remote BICA server system 260 and associated storage 280, details and operations of which are further described below.

In a manner similar to that described with respect to building 199 of FIG. 1, during capture of the interior of building 299, the BICA application (e.g., a local client application executing on mobile device 205, the remote BICA system 260 via communication over the network(s) 201, etc.) provides guidance cues and manages video recording while a user of the mobile device rotates the mobile device around a vertical axis at each of a sequence of viewing locations 210A-210H. Furthermore, and also in a manner similar to that described with respect to building 199 of FIG. 1, the BICA application captures linking information during movement of the mobile device between the viewing locations 210 along travel path 215. In the depicted embodiment of FIG. 2, the captured linking information includes sensor data provided by sensor modules of the mobile device (including acceleration data) and further includes additional video recording captured during such movement.

Following the capture of a last viewing location 210H in the sequence, the BICA application receives an indication from the user that capture of the building 299 interior is complete. In the depicted embodiment of FIG. 2, the captured information regarding building 299 is transferred for processing to the remote BICA system 260 via one or more computer networks 201 (e.g., as initiated by a local BICA client application, if any, on the mobile device; as initiated by a user of the mobile device; as initiated by the remote BICA system 260, such as periodically or as is otherwise initiated; etc.). In various embodiments, such contact and ensuing information transmission may be performed at various times. For example, the BICA application may allow the user to schedule the transmission for a specified time, such as to conserve battery power for the mobile device 205 by restricting transmissions to time periods in which the mobile device is externally powered, or to delay transmitting until a particular network connection is available (e.g., in order to utilize a local Wi-Fi connection for such transmission rather than a cellular network connection, such as to lessen or remove the impact of the transmission on a limited "data plan" of the user), or to delay transmitting until the mobile device is docked or otherwise can use a non-wireless physical connection.

In certain scenarios and embodiments, portions of the captured information for a building interior may be transmitted at different times for subsequent processing. For example, video recordings captured at some or all of the viewing locations for a building interior may be transmitted independently of any linking information captured during movement of the mobile device between such viewing locations, or vice versa. As another example, one or more portions of captured information for a building interior may be transmitted prior to fully completing the capture of all viewing locations within that building interior, such as to enable the remote BICA system 260 to generate corresponding panorama images for such viewing locations concurrently with the capture of additional building interior information, to determine relative positional information for certain viewing locations concurrently with the capture of additional building interior information, and/or to analyze the transmitted portions of the captured information to determine and provide notification of any problems with those transmitted portions. In this manner, the BICA system may provide a notification to the user that one or more of the viewing locations should be recaptured while the user is still within the building interior, such as if the BICA system determines during processing of the corresponding video recordings for those viewing locations that such video recordings are of insufficient or undesirable quality to serve as the basis for generating a panorama image, or do not appear to provide complete coverage of the building (e.g., if only 1 of 3 expected bathrooms have been captured, such as based on a floor plan or other information that is available about the building).

In the depicted implementation of FIG. 2, the BICA system 260 includes a data collection manager 262 (for managing the acquisition, receipt and storage of captured media, sensor data, and other information related to building interiors); a data analysis manager 264 (for managing analysis of received sensor data and other information, including to determine relative positional information regarding related viewing locations of a building interior); a media analysis manager 266 (for managing analysis of received media, including generation of panorama images for viewing locations based on received video data); Web server 268; GUI 272; and an application programming interface ("API")

270 for programmatic access by remote executing software programs. The BICA system is communicatively coupled (locally or remotely) to storage facility 280, which includes building information database 282, user information database 284 with various user-specific information (e.g., user preferences), and media information database 286. In certain implementations, the storage facility 280 may be incorporated within or otherwise directly operated by the BICA system; in other implementations, some or all of the functionality provided by the storage facility may be provided by one or more third-party network-accessible storage service providers (e.g., via network 201 and/or one or more other intervening networks, not shown).

Continuing the example of FIG. 2, processing of the captured information regarding the building 299 interior is performed in a manner similar to that described with respect to the processing of captured information regarding the building 199 interior of FIG. 1. In particular, a panorama image is generated for each of viewing locations 210A-210H based on one or more analyses of the respective video recording corresponding to each such viewing location, with various operations performed on individual frames of each such video recording as part of generating a corresponding panorama image. Analysis of the linking information corresponding to each segment of travel path 215 is performed in order to determine relative positional information between successive viewing locations 210 along that travel path, including an analysis of acceleration data (and any additional sensor data) corresponding to each such travel path segment to determine a relative location of viewing location 210B with respect to previous viewing location 210A; a relative location of viewing location 210C with respect to previous viewing location 210B; and so on.

In various scenarios and embodiments, specific aspects of the processing of the captured information may be performed by the remote BICA system 260, by a local BICA client application (not shown) executing on mobile device 205, or both. For example, the local BICA client application may analyze captured sensor data in order to insert one or more markers into corresponding video information recorded during capture of the building interior, such as to separate the recorded video information into portions respectively corresponding to the capture of each viewing location within the building interior and other portions respectively corresponding to the capture of linking information during movement between those viewing locations. In this manner, transmission and/or analysis of the captured information may be performed in an apportioned manner rather than as a single unit. As another example, the remote BICA system 260 may generate a panorama image for each of the viewing locations within a building interior, while a local BICA client application executing on mobile device 205 may analyze the captured linking information in order to determine relative locations for such viewing locations, or vice versa. It will be appreciated that in various embodiments, any combination of local and remote processing of the captured information regarding a building interior may be performed by one or both of the remote BICA system and local BICA client application, or that instead only one of the remote and local applications may be used.

In the depicted computing environment 200 of FIG. 2, the network(s) 201 is one or more publicly accessible linked networks, possibly operated by various distinct parties, such as the Internet. In other implementations, the network 201 may have other forms. For example, the network 201 may instead be a private network, such as a corporate or university network that is wholly or partially inaccessible to non-privileged users. In still other implementations, the network 201 may include both private and public networks, with one or more of the private networks having access to and/or from one or more of the public networks. Furthermore, the network 201 may include various types of wired and/or wireless networks in various situations. In addition, in this illustrated example of FIG. 2, users may utilize client computing systems and/or other client devices (such as mobile device 205) to interact with the BICA system 260 to obtain various described functionality via the network 201, and in doing so may provide various types of information to the BICA system. Moreover, in certain implementations, the various users and providers of the networked environment 200 may interact with the BICA system and/or one or more other users and providers using an optional private or dedicated connection.

Again with reference to FIG. 2, once respective panorama images have been generated for each of the viewing locations 210A-210H and relative positional information with respect to those viewing locations has been determined, the BICA system 260 generates a presentation of the building 299 interior based on the respective panorama images and relative positional information to create a group of linked panorama images. In particular, based on the relative positional information, the BICA system associates each panorama image (which corresponds to a single one of viewing locations 210) with additional information reflecting one or more links to one or more other of the viewing locations. For example, in the depicted embodiment, the BICA system might associate the generated panorama image corresponding to viewing location 210G with links respectively associated with each of viewing locations 210C, 210E, 210F, and 210H. In certain embodiments, the BICA system may determine to associate a panorama image with links corresponding to each additional viewing location within the building interior that satisfy one or more defined criteria. As non-limiting examples, such criteria for associating a link may include whether the viewing location corresponding to the link is visible at least in part from the viewing location that corresponds to the panorama image; whether the viewing location corresponding to the link is within a defined proximity to the viewing location that corresponds to the panorama image; whether sufficient information is available to determine the relative position or direction of the viewing location from the viewing location that corresponds to the panorama image; or other suitable criteria. Note that as described above with respect to the generated panorama image corresponding to viewing location 210G, link information may be associated with a panorama image such that the associated links include links corresponding to viewing locations other than those that were consecutively captured during the original capture process—for example, during the capture of building 299 interior, viewing location 210G was immediately preceded along travel path 215 by viewing location 210E and immediately followed by viewing location 210H, and yet links may be associated for the 210G panorama image that correspond to any or all of viewing locations 210A, 210B, 210C, 210D, and 210F as well.

In certain embodiments, generating a presentation of the building 299 interior may include determining an initial panorama image to display as a "starting point" of the presentation. It will be appreciated that the initial panorama image selected by the BICA system may or may not correspond to the first viewing location for the original capture of the building interior (i.e., viewing location 210A for the building 299 interior in FIG. 2). For example, the BICA system may determine to designate an initial panorama image that corresponds to a viewing location visible from the most other viewing locations within the building interior; that corresponds to a viewing location within a particular type of room within the building interior (e.g., a building lobby, and entryway, a living room, a kitchen, or other type); that corresponds to a viewing location within a room of the building interior that appears to encompass a greatest square footage; or that corresponds to a viewing location satisfying other defined criteria.

In addition to the automated generation of the representation of the building 299 interior (including generation of panorama images and determination of inter-panorama links based on determined relative position information between corresponding viewing locations), the described techniques may in at least some embodiments include enabling the user carrying the mobile device and/or one or more other users (e.g., operators of the BICA system 260) to modify the generated representation of the building interior in various manners, such as via a corresponding GUI provided by the BICA system. Such modification may include, for example, adding, deleting and/or changing determined inter-panorama links (e.g., to adjust links to pass through doorways or other passages between rooms rather than through walls; to add or remove links corresponding to end user expectations of related viewing locations; etc.). In addition, such modification may further include other changes, such as changing panorama images (e.g., removing a panorama image if its viewing location is not useful or if there are other problems with the panorama image; selecting a new starting image/direction in a panorama image when it is initially displayed; selecting a new starting panorama image to display for the building interior; etc.), adding or otherwise modifying textual and/or audio annotations or descriptions for particular panoramas images and/or inter-panorama links, etc. In addition, in at least some embodiments, the described techniques may include enabling a user of the mobile device to utilize individual component images of a panorama image in various manners, such as to generate one or more "thumbnail" images corresponding to individual component images; to extract and modify an individual component image (e.g., to crop, to resize, or otherwise edit the image); to share individual component images to one or more social media sites or other forum; to insert in web pages or other publications regarding a captured building, such as real estate descriptions; and to otherwise use such a component image as a digital photograph.

Once a presentation for a building interior is generated, the BICA system stores the presentation for future use (e.g., in linked panorama building information database 282 or other component of storage 280 as depicted within FIG. 2), such as to respond to one or more later requests to display the presentation for a specified building interior that has been previously captured. For example, in response to a request from an end user to display a presentation for building 299 interior, the BICA system 260 may retrieve the relevant presentation information from storage 280 and selectively transmit some or all of such presentation information to a client computing system (not shown) of the end user (such as via network 201 and one or more of Web server 268, GUI 272 and API 270). In so doing, the BICA system provides information that causes the client computing device to display an initial panorama image corresponding to a determined first viewing location within the building interior—for example, viewing location 210C may be selected as the first viewing location for the presentation, with an initial primary component image of the panorama image associated with viewing location 210C being displayed to the end user.

In at least some embodiments, the display of the panorama image is performed in a user-navigable manner, such as to allow the user to determine a sequence, direction, and/or rate of display of additional component images of the generated panorama image. For example, in certain embodiments the user may navigate the panorama image by using an input device (a mouse, touchscreen, virtual-reality display, or other input device) to selectively "turn" within the panorama image, such that the BICA system causes the client computing system to display one or more additional component images or other portions of the panorama image in accordance with the received user input. In addition, the presentation as a whole is navigable by the user via selection of the respective link information associated with one or more other viewing locations (and other corresponding panorama images) by the BICA system when generating the presentation information—in this manner, the user may navigate the entirety of the presentation for a building interior via selection of displayed link during display of panorama images, such as to initiate display by the BICA system of other corresponding panorama images associated with other viewing locations within the building interior to which the selected links correspond. Additional details related to the determination of inter-panorama links based on determined relative position information between corresponding viewing locations is included in U.S. patent application Ser. No. 15/649,434, entitled "Connecting And Using Building Interior Data Acquired From Mobile Devices" and filed on Jul. 13, 2017, which is hereby incorporated by reference in its entirety.

Figure 3:
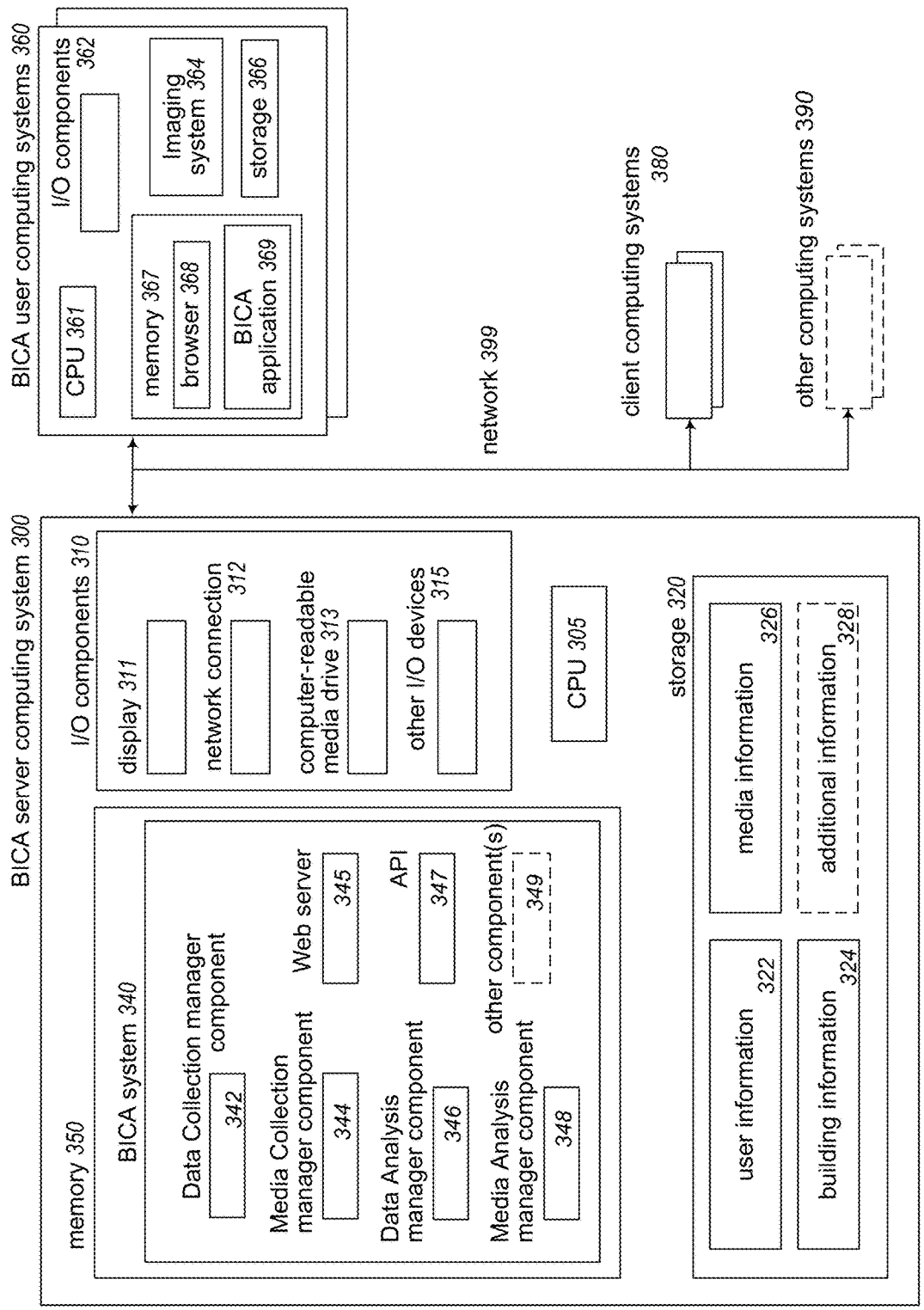
FIG. 3 is a block diagram illustrating a computing system suitable for executing an embodiment of a system that performs at least some of the techniques described in the present disclosure.

FIG. 3 is a block diagram illustrating an embodiment of a server computing system 300 executing an implementation of a BICA system 340—the server computing system and BICA system may be implemented using a plurality of electronic circuits that, when in combined operation, are suitable for performing and configured to perform at least some of the techniques described herein. In the illustrated embodiment, the server computing system 300 includes one or more hardware central processing units ("CPU") or other processors 305, various input/output ("I/O") components 310, storage 320, and memory 350, with the illustrated I/O components including a display 311, a network connection 312, a computer-readable media drive 313, and other I/O devices 315 (e.g., keyboards, mice or other pointing devices, microphones, speakers, GPS receivers, etc.). The server computing system 300 and executing BICA system 340 may communicate with other computing systems via one or more networks 399 (e.g., the Internet, one or more cellular telephone networks, etc.), such as BICA user computing systems 360, client computing systems 380, and other computing systems 390.

In the illustrated embodiment, an embodiment of the BICA system 340 executes in memory 350 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BICA system includes data collection manager component 342 (e.g., in a manner corresponding to data collection manager 262 of FIG. 2), media collection manager component 344, data analysis manager component 346 (e.g., in a manner corresponding to data analysis manager 264 of FIG. 2), media analysis manager component 348 (e.g., in a manner corresponding to media analysis manager 266 of FIG. 2), Web server 345 (e.g., in a manner corresponding to Web server 268 of FIG. 2), API 347 (e.g., in a manner corresponding to API 270 of FIG. 2), and (optionally) other programs and components 349. As part of such automated operations, the BICA system 340, components thereof, and/or other optional programs or components 349 executing in memory 330 may store and/or retrieve various types of data, including in the example database data structures of storage 320. In this example, the data used may include various types of user information in database ("DB") 322, various types of building information in DB 324, various types of media information in DB 326, and/or various types of additional information 328, such as various analytical information related to one or more building interiors previously captured, analyzed, and/or presented by the BICA system.

Some or all of the user computing systems 360 (e.g., mobile devices), client computing systems 380, and other computing systems 390 may similarly include some or all of the types of components illustrated for server computing system 300. As a non-limiting example, the BICA user computing systems 360 include hardware CPU(s) 361, I/O components 362, storage 366, and memory 367. In the depicted embodiment, the BICA user computing systems 360 also include an imaging system 364, and both a browser 368 and BICA client application 369 are executing within memory 367.

It will be appreciated that computing system 300 and other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BICA system 340 may in some embodiments be distributed in various components other than those specifically illustrated. Similarly, in some embodiments, some of the functionality of the BICA system 340 may not be provided and/or other additional functionality may be available. In addition, in certain implementations, various functionality of the BICA system may be provided by third-party partners of an operator of the BICA system. For example, data collected by the BICA system may be provided to a third party for analysis and/or metric generation.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the BICA system 340 and/or BICA client software executing on user computing systems 360 and/or client computing devices 380) and/or data structures, such as by execution of software instructions of the one or more software programs and/or by storage of such software instructions and/or data structures. Furthermore, in some embodiments, some or all of the systems and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
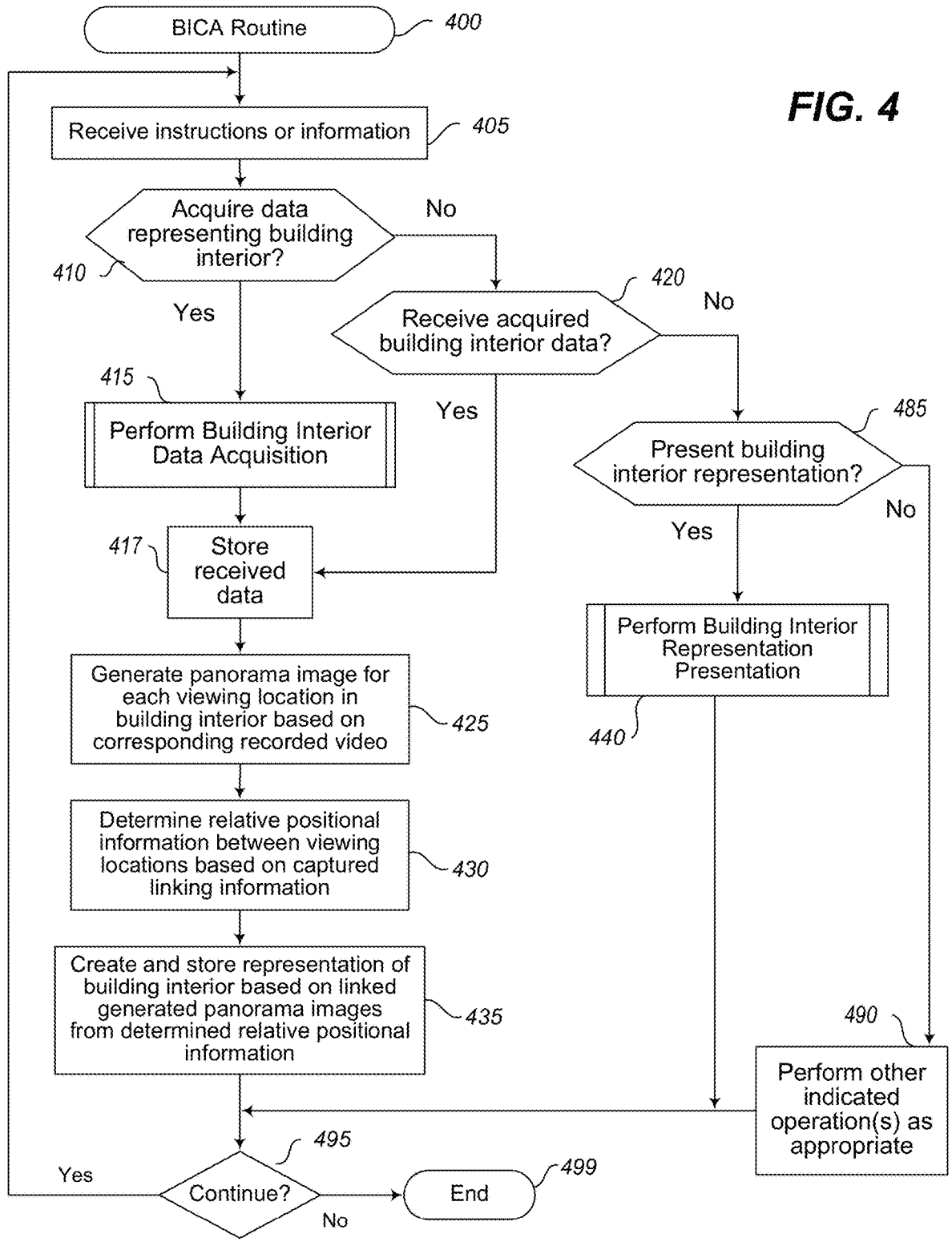
FIG. 4 depicts a process flow for a Building Interior Capture and Analysis routine in accordance with an embodiment of the present disclosure.
Figure 5:
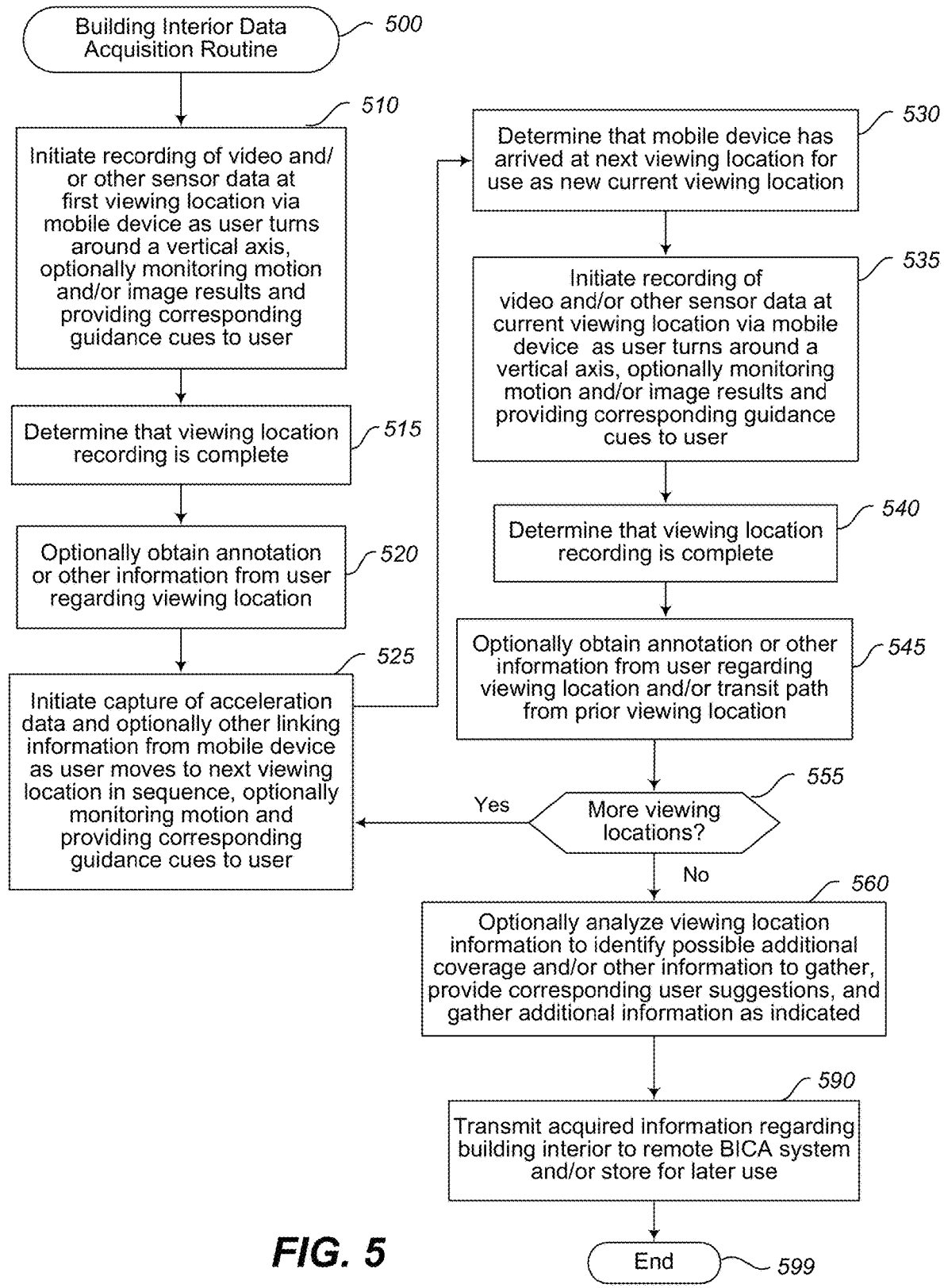
FIG. 5 depicts a process flow for a building interior data acquisition routine in accordance with an embodiment of the present disclosure.
Figure 6:
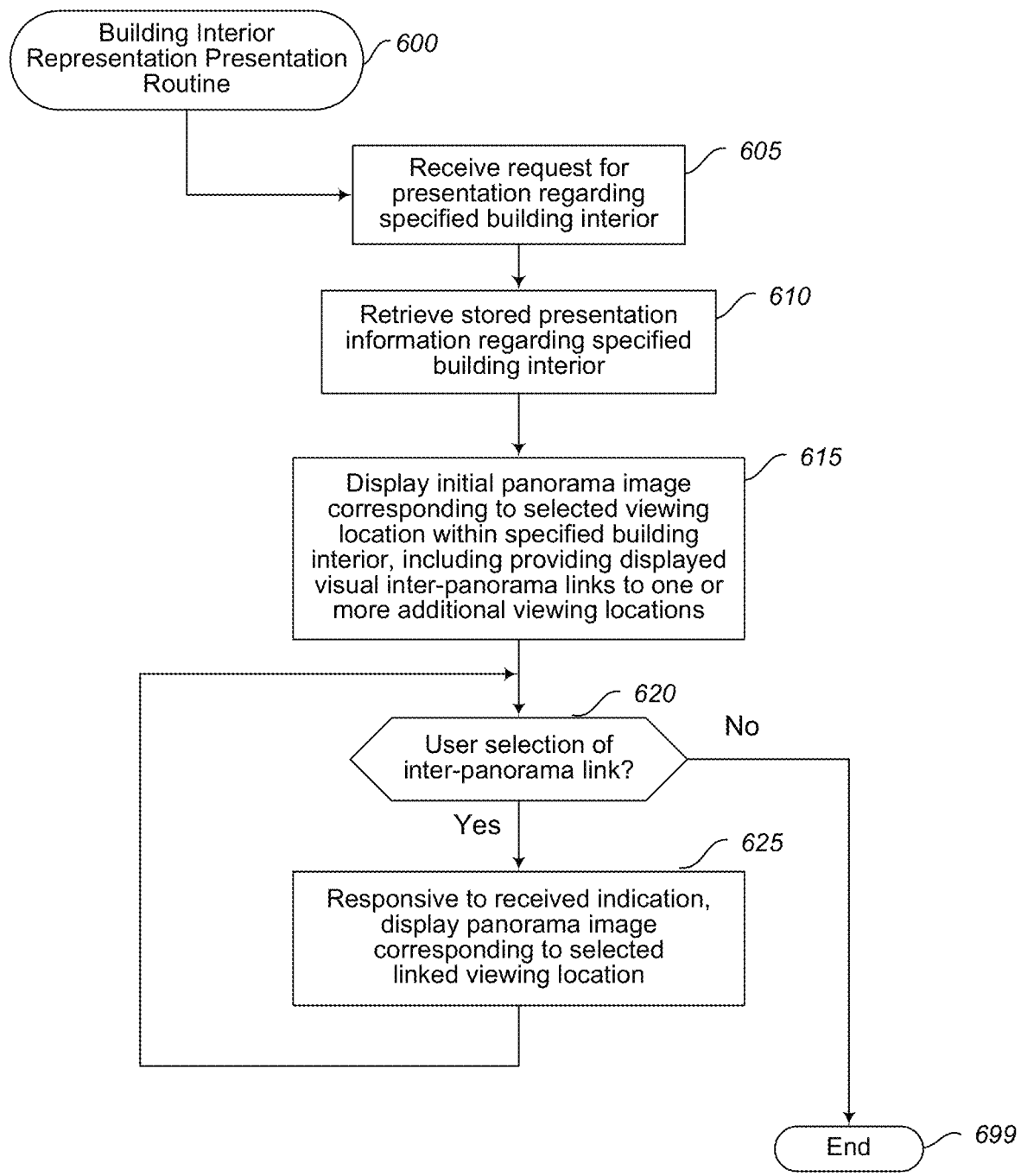
FIG. 6 depicts a process flow for a building interior representation presentation routine in accordance with an embodiment of the present disclosure.

FIGS. 4-6 depict exemplary automated operations for acquiring, analyzing and presenting information regarding a building, such as may be performed in some embodiments in part or in whole by a BICA system (e.g., by the BICA application 155 of FIG. 1, by one or more components of the BICA system 260 of networked environment 200 depicted by FIG. 2, and/or the BICA system 340 executed by the server computing system 300 of FIG. 3). In particular, FIG. 4 depicts an example overview process flow for a BICA routine; FIG. 5 depicts an example process flow for a building interior data acquisition routine; and FIG. 6 depicts an example process flow for a building interior representation presentation routine.

FIG. 4 illustrates an example flow diagram for an embodiment of a Building Interior Capture and Analysis routine 400. The routine of FIG. 4 begins at block 405, in which instructions or information are received. At block 410, the routine determines whether the received instructions or information indicate to acquire data representing a building interior. If so, the routine proceeds to block 415 in order to perform a building interior data acquisition subroutine (with one example of such a routine illustrated in FIG. 5, as discussed further below) in order to acquire data representing the interior of a target building of interest. If it was determined at block 410 that the received instructions or information did not indicate to acquire data representing a building interior, the routine proceeds to block 420 to determine whether the received instructions or information included acquired building interior data, such as a transmission of previously captured building interior data from a remote mobile device (e.g., a mobile device executing a local instance of a BICA application), with the transmission of acquired building interior data from mobile device 205 to BICA system 260 via network(s) 201 of FIG. 2 illustrating one example of such data acquisition. Following block 415, or after a determination is made in block 420 that the received instructions or information include acquired building interior data, the routine proceeds to block 417 in order to store the acquired data.

After block 417, the routine proceeds to block 425, in which (whether via local processing, remote processing, or some combination thereof) a panorama image is generated for each viewing location of the captured building interior based on a corresponding recorded video for the viewing location, and then to block 430, in which (whether via local processing, remote processing, or some combination thereof) relative positional information between viewing locations of the building interior is determined based on the linking information captured during movement of the mobile device between those viewing locations.

It will be appreciated that, despite the categorical method of processing depicted in FIG. 4 in which all panorama images are generated based on analysis of recorded viewing location information prior to determining relative positional information for viewing locations, any order for such processing may be implemented in accordance with the techniques described herein. For example, the routine may instead process individual segments of captured information sequentially, such that a panorama image is generated for a first viewing location, followed by processing of linking information captured during movement away from that first viewing location to determine relative positional information for a second viewing location; a panorama image generated for the second viewing location, followed by processing of linking information captured during movement away from that second viewing location to determine relative positional information for a third viewing location; etc. In various embodiments, processing of captured information for one or many building interiors may be performed in a parallel and/or distributed manner, such as by utilizing one or more parallel processing computing clusters (e.g., directly by the BICA system or via one or more third-party cloud computing services).

At block 435, the routine creates and stores a representation of the captured building interior based on the panorama images generated in block 425 that are linked using the relative positional information for the multiple viewing locations determined in block 430. In particular, and as described elsewhere herein, each panorama image (corresponding to one viewing location within the building interior) is associated with information reflecting one or more user-selectable links to one or more other of the viewing locations, such that selection of a user-selectable link while viewing a panorama image associated with one viewing location initiates display of a distinct other panorama image associated with another viewing location.

If it was determined in block 420 that the instructions or information received in block 405 did not indicate to receive acquired building interior data, the routine proceeds to block 485, in which it determines whether the received instructions or information include an indication to present a previously stored representation of a building interior. If so, the routine proceeds to block 440 to perform a building interior representation presentation subroutine, to cause a display or other presentation of a created representation of a target building interior (such as via a client computing system of an end user, and with one example of such a routine illustrated in FIG. 6, as discussed further below).

If it was determined in block 485 that the instructions or information received in block 405 did not include an indication to present a previously stored representation of a building interior, control passes to block 490 to perform any other indicated operations as appropriate, such as any housekeeping tasks, to obtain and store information about users of the system, to configure parameters to be used in various operations of the system, etc.

Following blocks 435, 440, or 490, the routine proceeds to block 495 to determine whether to continue, such as until an explicit indication to terminate. If it is determined to continue, control returns to block 405 to await additional instructions or information, and if not proceeds to step 499 and ends.

FIG. 5 illustrates an example flow diagram for an embodiment of a Building Interior Data Acquisition routine 500. The routine may be initiated in various manners in various embodiments, such as from block 415 of FIG. 4, or instead in some embodiments by a user interacting directly with a mobile device to initiate video recording inside a building interior (e.g., by a local BICA application on the mobile device; if the video recording of the building interior is performed as one or more videos without the use of a local BICA application, and with corresponding IMU linking data later retrieved from the mobile device; etc.).

The illustrated embodiment of the routine begins at block 510, in which the routine initiates recording video and/or sensor data at a first viewing location within the building interior as a mobile device with imaging capabilities is rotated around a vertical axis located at the first viewing location. In addition, the routine may in some embodiments optionally monitor the motion of the mobile device during the recording at the first viewing location, and provide one or more guidance cues to the user regarding the motion of the mobile device, quality of the video being recorded, associated lighting/environmental conditions, etc.

At block 515, the routine determines that video recording of the viewing location is completed. As discussed elsewhere herein, such determination may be based on an explicit indication from a user of the mobile device, or may be automatically determined based on one or more of an analysis of sensor data, the video being recorded, the user remaining substantially motionless for a defined period of time, etc.

At block 520, the routine optionally obtains annotation and/or other information from the user regarding the captured viewing location. For example, in certain embodiments the BICA system may record audible or textual annotations from the user to further describe the viewing location (e.g., to provide a label or other description of the viewing location, to describe aspects of the viewing location that the recorded video or sensor data may not adequately capture, etc.), such as for later use in presentation of information about that viewing location.

After blocks 515 and 520, the routine proceeds to block 525 to initiate the capture of linking information (including acceleration data) during movement of the mobile device along a travel path away from the current viewing location and towards a next viewing location within the building interior. As described elsewhere herein, the captured linking information may include additional sensor data as well as additional video information recorded during such movement. Initiating the capture of such linking information may be performed in response to an explicit indication from a user of the mobile device or based on one or more automated analyses of information recorded from the mobile device. In addition, and in a manner similar to that noted with respect to capturing the first viewing location in block 510, the routine may further optionally monitor the motion of the mobile device in some embodiments during movement to the next viewing location, and provide one or more guidance cues to the user regarding the motion of the mobile device, quality of the sensor data and/or video information being captured, associated lighting/environmental conditions, advisability of capturing a next viewing location, and any other suitable aspects of capturing the linking information. Similarly, the routine may optionally obtain annotation and/or other information from the user regarding the travel path, such as for later use in presentation of information regarding that travel path or a resulting inter-panorama connection link.

At block 530, the routine determines that the mobile device has arrived at a next viewing location after the user travel path segment to which the linking data corresponds, for use as a new current viewing location. As described in greater detail elsewhere herein, such determination may be based on one or more of an explicit user request, an analysis of incoming sensor data, recorded video information, the user remaining substantially motionless for a defined period of time, etc. In response to the determination, the routine proceeds to block 535 to initiate capture of the current viewing location in a manner similar to that described for blocks 510-520 with respect to the first viewing location. In particular, the routine initiates recording of video and/or sensor data at the current viewing location within the building interior as the mobile device is rotated around a vertical axis located at the current viewing location, optionally monitoring the recording to provide one or more guidance cues to the user regarding the capture process.

At block 540, in a manner similar to that noted with respect to block 515 for the first viewing location, the routine determines that recording of the current viewing location is completed, such as based on an explicit indication from a user, and/or one or more analyses of information from the mobile device. At block 545, the routine optionally obtains annotation and/or other information from the user regarding the captured viewing location and/or the travel path from the previous viewing location, such as audible or textual annotations from the user to further describe the viewing location or travel path, such as for later use in presentation of information regarding that viewing location and/or use of that travel path.

The routine proceeds to block 555 to determine whether all viewing locations within the building interior that have been selected by the user have been captured, such as based on an express request by a user of the mobile device to terminate the capturing process or, alternatively, a determination that the capturing process is to continue (such as via analysis of acceleration or other sensor data indicating that the mobile device is moving to a subsequent viewing location). If it is determined that the capturing process is to continue—i.e., that not all viewing locations for the building interior have yet been captured by the mobile device—the routine returns to block 525 in order to capture linking information during movement of the mobile device to the next viewing location in sequence within the building interior. Otherwise, the routine proceeds to block 560 to optionally analyze viewing location information, such as in order to identify possible additional coverage (and/or other information) to acquire within the building interior. For example, the BICA system may provide one or more notifications to the user regarding the information acquired during capture of the multiple viewing locations and corresponding linking information, such as if it determines that one or more segments of the recorded information are of insufficient or undesirable quality to serve as the basis for generating a panorama image, or do not appear to provide complete coverage of the building, or would provide information for additional inter-panorama links.

After block 560, the routine proceeds to block 590 to store the acquired data and/or to transmit the acquired data from the mobile device to a remote BICA system (such as for analysis and/or storage by the remote BICA system for future use). The routine then proceeds to block 599 and ends. In situations in which the routine 500 is invoked from block 415 of FIG. 4, the routine will then return to block 417 of FIG. 4, including to provide the acquired building interior data to that routine 400.

FIG. 6 illustrates an example flow diagram for an embodiment of a Building Interior Representation Presentation routine 600. The routine may be initiated in various manners in various embodiments, such as from block 440 of FIG. 4, or instead in some embodiments by an end user interacting with his or her client device to obtain (e.g., retrieve from a remote location over one or more networks and/or from local storage) information about one or more linked panorama images representing a building interior. While the illustrated embodiment includes the linked panorama images representing or covering a single house, building or other structure, in other embodiments the linked panoramas may extend beyond a single such structure, as discussed in greater detail elsewhere herein.

The example embodiment of the routine begins at block 605, in which a user request is received for displaying of presentation information regarding a specified building interior that has been previously captured.

In response to the user request, the routine proceeds to block 610 to retrieve stored presentation information regarding the specified building interior. Once the presentation information is retrieved, the routine proceeds to block 615, and causes a client computing system associated with the user request to display an initial panorama image corresponding to a determined first viewing location within the specified building interior, as well as to display indications of one or more visual inter-panorama links to corresponding additional viewing locations, such as by transmitting information to the client computing system that includes at least the initial panorama image and its inter-panorama links (and optionally corresponding information for some or all other panorama images for the building). As described elsewhere herein, the initial panorama image may or may not correspond to the viewing location first captured within the specified building interior. In addition, it will be appreciated that an end user may use various local controls to manipulate the initial panorama image in various manners, such as to move horizontally and/or vertically within the panorama image to display different views (e.g., different directions within the building from the viewing location to which the initial panorama image corresponds), to zoom in or out, to apply various filters and/or otherwise adjust the quality or type of information displayed (e.g., if the initial panorama image is constructed from one or more rotations at the viewing location that use different settings or otherwise acquire different types of data, such as one rotation that captures visible light, another rotation that captures infrared light/energy, another rotation that captures ultraviolet light/energy, etc.).

At block 620, after the end user is done with the initial panorama image, the routine determines whether the end user has selected one of the provided links associated with the displayed panorama image, or has instead indicated that the end user is done (e.g., closed the current panorama image and/or its local viewing application on the client system). If the end user is done, the routine continues to block 699 and ends. Otherwise, responsive to the end user selection of one of the displayed links, at block 625 the routine causes the associated client computing system to display a distinct additional panorama image (or other information) corresponding to the selected link in a manner similar to that described with respect to block 615, as well as to display indications of one or more additional links to corresponding additional viewing locations as appropriate for the additional panorama image—as part of doing so, the server system providing the building representation information may optionally transmit additional corresponding information to the client computing system at that time in a dynamic manner for display, or the client computing system may instead optionally retrieve information that was previously sent with respect to block 715 and use that. After block 625, the routine returns to block 620 to await an indication of another user selection of one of the user-selectable links provided as part of the presentation, or to otherwise indicate that the end user is done. In situations in which the routine 600 is invoked from block 440 of FIG. 4, the routine will then return to block 495 of FIG. 4 when it reaches block 699.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    recording, with one or more mobile devices and by at least a first user, visual data at a first viewing location in a building for use in generating a panorama image for the first viewing location that has views from the first viewing location for each of multiple directions;
    determining, by one or more computing devices, a problem with at least some of the recorded visual data, and notifying the first user of the determined problem;
    recording, with the one or more mobile devices and in response to the notifying, additional visual data at the first viewing location;
    creating, by the one or more computing devices and based at least in part on using the additional visual data, the panorama image for the first viewing location;
    determining, by the one or more computing devices, one or more of the multiple directions from the first viewing location at which one or more additional panorama images for one or more additional viewing locations for the building are available for display; and
    displaying, by the one or more computing devices, the created panorama image and further displaying one or more visual indicators overlaid on the displayed panorama image to visually indicate on the displayed panorama image the one or more directions from the first viewing location to the one or more additional panorama images for the one or more additional viewing locations for the building.

2. The computer-implemented method of claim 1 further comprising, before the displaying of the panorama image and the one or more overlaid visual indicators:
    creating, by the one or more computing devices, a second panorama image that is one of the one or more additional panorama images, wherein the second panorama image is for a second viewing location and is based on further visual data recorded with the one or more mobile devices at the second viewing location; and
    capturing linking information related to a travel path between the first viewing location and the second viewing location, and
    wherein the determining of the one or more directions from the first viewing locations includes determining, by the one or more computing devices and based at least in part on the captured linking information, one of the one or more directions that is from the first viewing location to the second viewing location,
    and wherein the displaying of the panorama image and the one or more overlaid visual indicators is performed while the first user is at the first viewing location and further includes displaying a visual representation of the determined one direction from the first viewing location to the second viewing location.

3. The computer-implemented method of claim 1 wherein the displaying of the panorama image and the one or more overlaid visual indicators includes transmitting the panorama image and information about the one or more overlaid visual indicators to a client device for display to an end user, wherein the displayed one or more visual indicators include a user-selectable visual representation overlaid on the displayed created panorama image of a link to one of the additional panorama images in a respective one of the one or more direction, and wherein the method further comprises receiving, after the display on the client device of the created panorama image and the user-selectable visual representation, an indication of a selection by the end user of the user-selectable visual representation, and causing, based at least in part on the selection, the client device to display the one additional panorama image.

4. The computer-implemented method of claim 1 wherein the recording of the visual data at the first viewing location includes recording video as at least one of the one or more mobile devices rotates through the multiple directions, and wherein the creating of the panorama image for the first viewing location includes using multiple video frames from the recorded video.

5. The computer-implemented method of claim 1 wherein the recording of the visual data at the first viewing location includes capturing multiple still photographic images at respective ones of the multiple directions, and wherein the creating of the panorama image for the first viewing location includes using at least some of the multiple still photographic images.

6. The computer-implemented method of claim 1 wherein the notifying of the first user of the determined problem includes at least one of providing a visual notification or providing an auditory notification.

7. The computer-implemented method of claim 1 wherein the notifying of the first user of the determined problem includes providing real-time feedback to the first user during the recording of the visual data.

8. The computer-implemented method of claim 1 wherein the determining of the problem with the at least some recorded visual data includes determining that rotation of at least one of the one or more mobile devices is at a speed that exceeds a threshold, and wherein the notifying of the first user of the determined problem includes providing an indication to slow the rotation.

9. The computer-implemented method of claim 1 wherein the determining of the problem with the at least some recorded visual data includes determining to perform multiple rotations of at least one of the one or more mobile devices at the first viewing location, and wherein the notifying of the first user of the determined problem includes providing an indication to perform the multiple rotations.

10. The computer-implemented method of claim 1 wherein the determining of the problem with the at least some recorded visual data includes determining that a quality problem exists with the recorded visual data, and wherein the notifying of the first user of the determined problem includes providing an indication to replace the at least some of the recorded visual data with the additional visual data in response to the determining that the quality problem exists.

11. The computer-implemented method of claim 1 wherein the determining of the problem with the at least some recorded visual data includes identifying one or more parameters of an imaging system of at least one of the one or more mobile devices, and wherein the notifying of the first user of the determined problem includes suggesting the identified one or more parameters for use with the imaging system during the recording of the additional visual data.

12. The computer-implemented method of claim 1 further comprising monitoring motion of at least one of the one or more mobile devices during the recording of the visual data, and wherein the notifying of the first user of the determined problem includes providing one or more guidance cues to the first user based on the monitored motion.

13. The computer-implemented method of claim 1 wherein the determining of the problem with the at least some recorded visual data includes identifying one or more conditions interfering with capturing of visual data at the first location with quality, and wherein the recording of the additional visual data is initiated by the one or more computing devices in response to a determination that the one or more conditions no longer interfere with the capturing of the visual data.

14. The computer-implemented method of claim 1 wherein the determining of the problem with the at least some recorded visual data includes identifying one or more parameters of an imaging system of at least one of the one or more mobile devices and modifying the imaging system to use the identified one or more parameters, and wherein the recording of the additional visual data is performed using the modified imaging system.

15. The computer-implemented method of claim 14 wherein the identifying of the one or more parameters of the imaging system is performed by the one or more computing devices based at least in part on a lens used with the imaging system.

16. The computer-implemented method of claim 14 wherein the identifying of the one or more parameters of the imaging system includes identifying, by the one or more computing devices, at least one of a setting for aperture, or a setting for exposure, or a setting for focus.

17. The computer-implemented method of claim 1 wherein the recorded visual data includes a plurality of frames of visual data, wherein the determining of the problem with the at least some recorded visual data includes identifying one or more frames of the plurality that satisfy one or more defined criteria, wherein the method further comprises discarding, by the one or more computing devices, the identified one or more frames, and wherein the recorded additional visual data includes visual information used to replace the discarded identified one or more frames.

18. The computer-implemented method of claim 1 further comprising:
generating, by the one or more computing devices, an interpolated image by combining at least some visual data recorded from the first viewing location with other visual data recorded from a different second viewing location; and
initiating, by the one or more computing devices, display of the generated interpolated image.

19. The computer-implemented method of claim 1 wherein the one or more mobile devices include a mobile computing device with at least one imaging system, and wherein the one or more computing devices include the mobile computing device.

20. A non-transitory computer-readable medium with stored contents that cause one or more computing devices to perform automated operations including at least:
obtaining, via one or more mobile devices operated by at least a first user, visual data at a first viewing location at a building for use in generating a panorama image for the first viewing location that has views from the first viewing location for each of multiple directions;
notifying, by the one or more computing devices, the first user of a determined problem with at least some of the visual data;

obtaining, via the one or more mobile devices and after the notifying, additional visual data at the first viewing location;

creating, by the one or more computing devices and based at least in part on using the additional visual data, the panorama image for the first viewing location; and initiating, by the one or more computing devices, display of information about the building that includes the created panorama image and further includes one or more visual indicators displayed on the displayed panorama image to indicate one or more directions from the first viewing location to one or more additional viewing locations for the building having one or more additional panorama images.

21. The non-transitory computer-readable medium of claim 20 wherein the stored contents include software instructions that, when executed, cause the one or more computing devices to perform further automated operations including, before the display of the panorama image and the one or more visual indicators:

creating, by the one or more computing devices, a second panorama image for a second viewing location that is based on further visual data obtained via the one or more mobile devices at the second viewing location;

capturing linking information related to a travel path between the first viewing location and the second viewing location; and determining, by the one or more computing devices and based at least in part on the captured linking information, the one or more directions, wherein the one or more directions include a first direction between the first viewing location and the second viewing location, and wherein the display of the panorama image and the one or more visual indicators includes displaying a visual representation of the determined first directions between the first viewing location and the second viewing location.

22. The non-transitory computer-readable medium of claim 20 wherein the initiating of the display of the panorama image and the one or more visual indicators includes initiating, by the one or more computing devices, the display on a client device to an end user, wherein the displayed one or more visual indicators include a user-selectable visual representation overlaid on the displayed created panorama image of a link to an additional panorama image at the building in an indicated direction from the first viewing location, and wherein the automated operations further include receiving, after the display on the client device of the created panorama image and the user-selectable visual representation, an indication of a selection by the end user of the user-selectable visual representation, and causing, based at least in part on the selection, the client device to display the additional panorama image.

23. A system comprising:

one or more hardware processors of one or more computing devices; and one or more memories with stored instructions that, when executed by at least one of the one or more hardware processors, cause the one or more computing devices to create and present information representing a building, including:

obtaining visual data recorded by one or more mobile devices at a first viewing location at a building for use in generating a panorama image for the first viewing location that has views from the first viewing location for each of multiple directions;

notifying a first user of a determined problem with the visual data;

obtaining, after the notifying, additional visual data recorded by the one or more mobile devices at the first viewing location, wherein the panorama image for the first viewing location is based at least in part on the additional visual data;

determining one or more of the multiple directions from the first viewing location that are toward one or more additional viewing locations for the building for which one or more additional panorama images are available for display; and providing information for display about the building, including initiating display of the panorama image for the first viewing location and of one or more visual indicators on the displayed panorama image to visually indicate information about the determined one or more directions from the first viewing location toward the one or more additional viewing locations for the building.

24. The system of claim 23 wherein the stored instructions include software instructions that, when executed, cause the one or more computing devices to perform further automated operations including, before the display of the panorama image and the one or more visual indicators:

capturing linking information related to a travel path from the first viewing location to a second viewing location that is one of the one or more additional viewing locations;

creating, by the one or more computing devices, a second panorama image for the second viewing location based on further visual data recorded with the one or more mobile devices at the second viewing location; and determining, by the one or more computing devices and based at least in part on the captured linking information, one of the one or more directions that is from the first viewing location to the second viewing location, and wherein the display of the panorama image and the one or more visual indicators includes displaying a visual representation of the determined one direction from the first viewing location to the second viewing location.

25. The system of claim 23 wherein the initiating of the display of the panorama image and the one or more visual indicators includes initiating, by the one or more computing devices, the display on a client device to an end user, wherein the displayed one or more visual indicators include a user-selectable visual representation overlaid on the displayed panorama image of a link to one of the additional viewing locations in a respective one of the one or more directions, and wherein the automated operations further include receiving, after the display on the client device of the panorama image and the user-selectable visual representation, an indication of a selection by the end user of the user-selectable visual representation, and causing, based at least in part on the selection, the client device to display an additional panorama image from the one additional viewing location.

26. The system of claim 23 wherein the determined problem with the visual data is with at least some of the visual data, wherein the first viewing location is within an interior space of the building, wherein the stored instructions further cause the one or more computing devices to create the panorama image for the first viewing location by replacing the at least some visual data with the additional visual data and to receive, from the first user, descriptive information about one or more attributes of the interior space, and wherein the providing of the information for display further includes providing the descriptive information for display.

27. The system of claim 23 wherein the one or more additional panorama images are generated using further visual data captured at the one or more additional viewing locations at a first time, wherein the obtaining of the additional visual data at the first viewing location occurs at a second time that is separated from the first time by an intervening period of time, and wherein the stored instructions further cause the one or more computing devices to generate one or more links between the first viewing location and the one or more additional viewing locations.

28. A computer-implemented method comprising:

recording, with one or more mobile devices and by at least a first user, visual data at a first viewing location in a building for use in generating a panorama image for the first viewing location that has views from the first viewing location for each of multiple directions;

determining, by one or more computing devices, a problem with the recorded visual data, and notifying the first user of the determined problem;

recording, with the one or more mobile devices and in response to the notifying, additional visual data at the first viewing location;

creating, by the one or more computing devices and based at least in part on the additional visual data, the panorama image for the first viewing location;

providing, by the one or more computing devices, information for display about the interior of the building that includes the created panorama image and information about one or more of the multiple directions from the first viewing location at which one or more additional panorama images for one or more additional linked viewing locations for the building are available for display; and notifying, by the one or more computing devices, that a different location at the building is unsuitable for creating a further panorama image from that different location, and wherein the recording of the visual data at the first viewing location is performed in response to the notifying that the different location at the building is unsuitable.

29. A system comprising:

one or more hardware processors of one or more computing devices; and one or more memories with stored instructions that, when executed by at least one of the one or more hardware processors, cause the one or more computing devices to create and present information representing a building, including:

obtaining visual data recorded by one or more mobile devices at a first viewing location at a building for use in generating a panorama image for the first viewing location that has views from the first viewing location for each of multiple directions, wherein the first viewing location is in a first room of multiple rooms in the building;

notifying a first user of a problem with the visual data;

obtaining, after the notifying, additional visual data recorded by the one or more mobile devices at the first viewing location, wherein the panorama image for the first viewing location is based at least in part on the additional visual data;

determining one or more of the multiple directions from the first viewing location that are toward one or more additional viewing locations for the building for which one or more additional panorama images are available for display; and providing information for display about the building that includes the panorama image for the first viewing location and information about the determined one or more directions from the first viewing location toward the one or more additional viewing locations for the building, and wherein the stored instructions further cause the one or more computing devices to receive, from the first user, descriptive information about the first room concerning one or more remodels, and wherein the providing of the information for display further includes providing the descriptive information for display.

* * * * *